US009555774B2

United States Patent
Boland

(10) Patent No.: US 9,555,774 B2
(45) Date of Patent: Jan. 31, 2017

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 613 days.

(21) Appl. No.: 13/262,740

(22) PCT Filed: Apr. 1, 2010

(86) PCT No.: PCT/EP2010/054399
§ 371 (c)(1),
(2), (4) Date: Dec. 19, 2011

(87) PCT Pub. No.: WO2010/112579
PCT Pub. Date: Oct. 7, 2010

(65) Prior Publication Data
US 2012/0110772 A1 May 10, 2012

(30) Foreign Application Priority Data
Apr. 2, 2009 (EP) .................................... 09157195

(51) Int. Cl.
B60S 1/38 (2006.01)
(52) U.S. Cl.
CPC ............. B60S 1/3856 (2013.01); *B60S 1/3808* (2013.01); *B60S 1/3853* (2013.01); *B60S 1/3858* (2013.01); *B60S 1/3868* (2013.01); *B60S 1/3877* (2013.01)
(58) Field of Classification Search
CPC ..... B60S 1/3808; B60S 1/3856; B60S 1/3868; B60S 1/381; B60S 1/3877; B60S 1/3881; B60S 1/3853; B60S 1/3858; B60S 1/3879
USPC ............. 15/250.32, 250.43–250.48, 250.201
See application file for complete search history.

(56) References Cited

U.S. PATENT DOCUMENTS

| 6,675,432 | B1 * | 1/2004 | De Block | 15/250.32 |
| 2006/0037167 | A1 * | 2/2006 | Nacamuli | 15/250.201 |
| 2006/0265830 | A1 * | 11/2006 | Walworth | B60S 1/38 15/236.02 |
| 2007/0113366 | A1 * | 5/2007 | Walworth et al. | 15/250.32 |
| 2007/0214593 | A1 * | 9/2007 | Boland | 15/250.23 |
| 2008/0256738 | A1 * | 10/2008 | Malone | 15/250.06 |
| 2008/0295272 | A1 * | 12/2008 | Jarasson | 15/250.32 |
| 2009/0056049 | A1 * | 3/2009 | Jarasson et al. | 15/250.32 |
| 2010/0170055 | A1 * | 7/2010 | Boland | 15/250.32 |

FOREIGN PATENT DOCUMENTS

| DE | WO0073113 A1 | 12/2000 | |
| DE | 10038993 A1 * | 3/2002 | B60S 1/40 |

(Continued)

OTHER PUBLICATIONS

WO0007856A2 (Abstract), 2000.*

*Primary Examiner* — Larry E Waggle, Jr.
*Assistant Examiner* — Andrew A Horton
(74) *Attorney, Agent, or Firm* — Robert L. Stearns; Dickinson Wright, PLLC

(57) ABSTRACT

A windscreen wiper device comprising a wiper blade with a spoiler at a side thereof facing away from the windscreen to be wiped, wherein the wiper device further includes a connecting device having a substantially U-shaped cross-section. Legs of the U-shaped cross-section are connected to the wiper blade on opposite sides thereof. An interior space is left open between the connecting device and the wiper blade for forming a water channel for transporting rain water therethrough.

18 Claims, 6 Drawing Sheets

(56) References Cited

FOREIGN PATENT DOCUMENTS

| | | | |
|---|---|---|---|
| DE | 10033779 A1 | 5/2002 | |
| DE | 10341275 A1 | 3/2005 | |
| DE | 10347637 A1 | 5/2005 | |
| DE | 10349637 A1 | 6/2005 | |
| DE | 102004017941 A1 | 11/2005 | |
| DE | 102005062463 A1 | 6/2007 | |
| DE | 212007000044 U1 | 2/2009 | |
| EP | 1627787 A | 2/2006 | |
| EP | 1876073 A1 | 1/2008 | |
| EP | 1876074 A | 1/2008 | |
| FR | 2893896 A | 6/2007 | |
| GB | 524165 A * | 7/1940 | ................ B60S 1/38 |
| GB | 1395466 A * | 5/1975 | ................ B60S 1/38 |
| WO | WO 0007856 A2 * | 2/2000 | ................ B60S 1/38 |
| WO | WO 2009000729 A1 * | 12/2008 | ................ B60S 1/38 |

\* cited by examiner

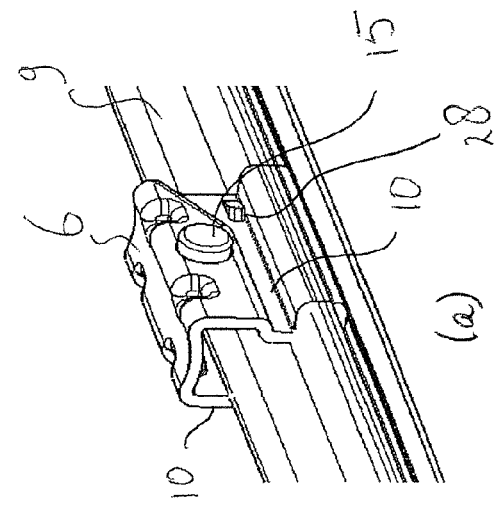
FIG. 3
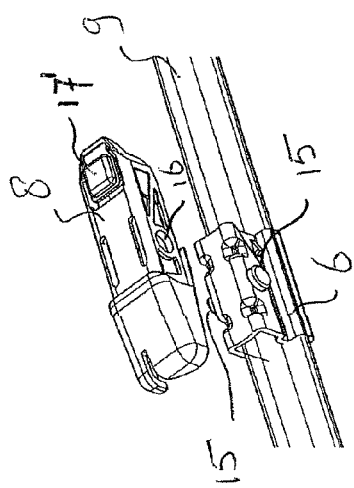
FIG. 2
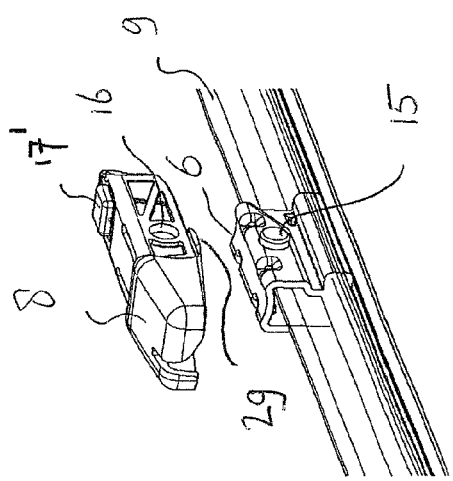

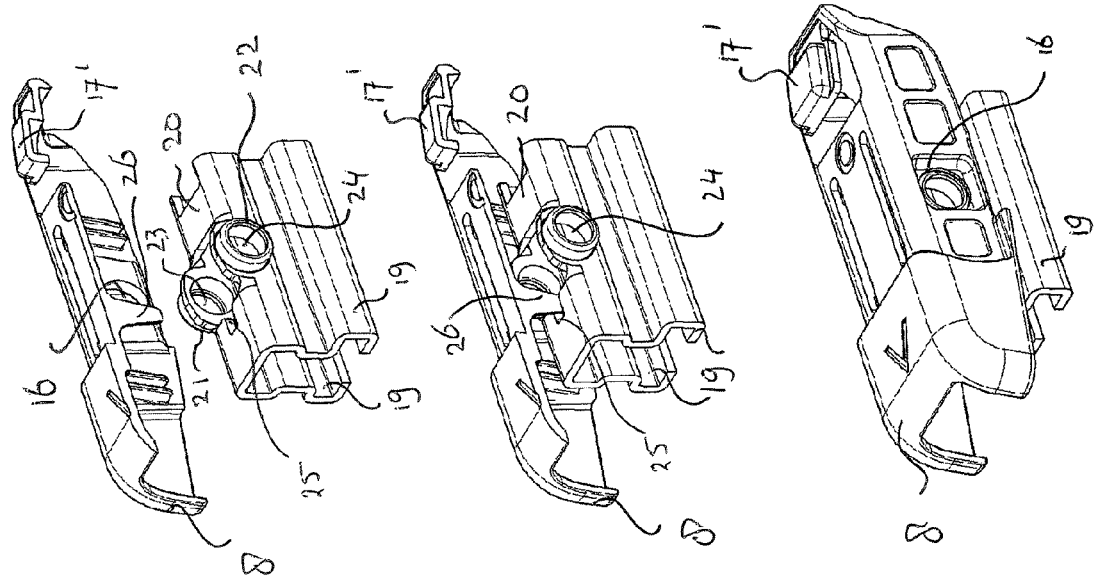
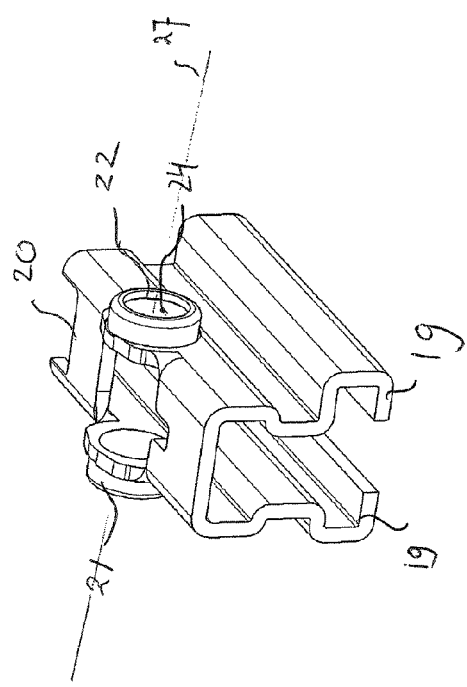
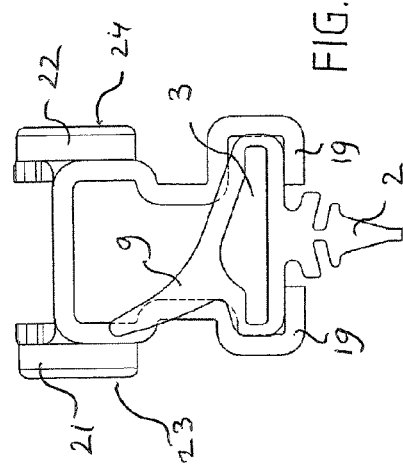
FIG. 7
FIG. 6

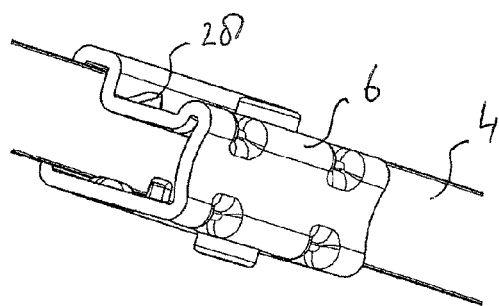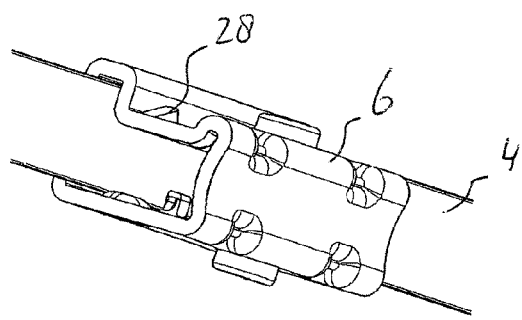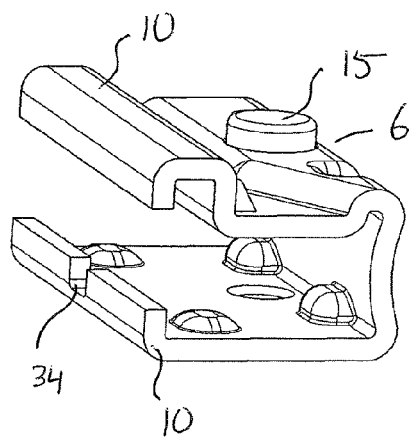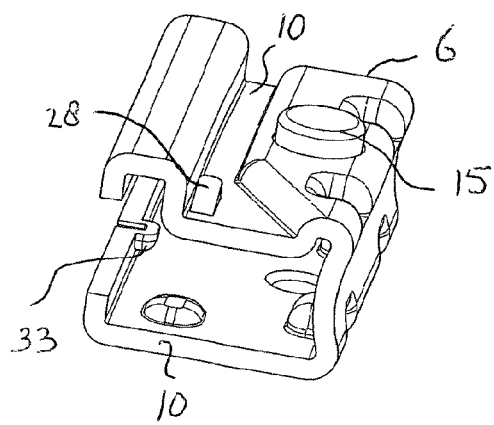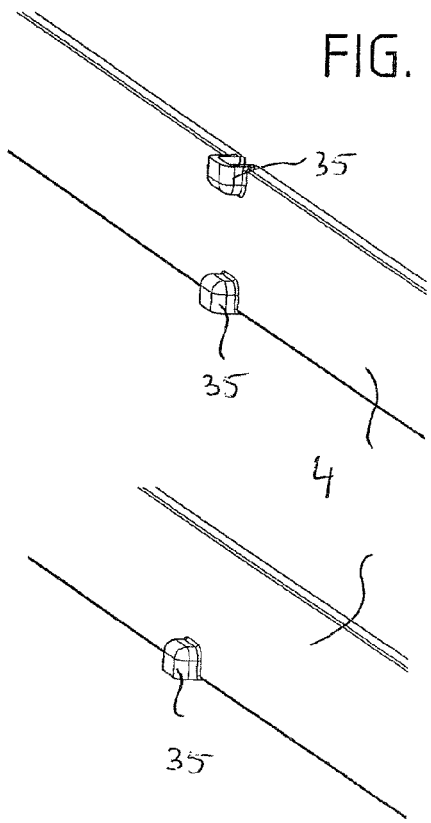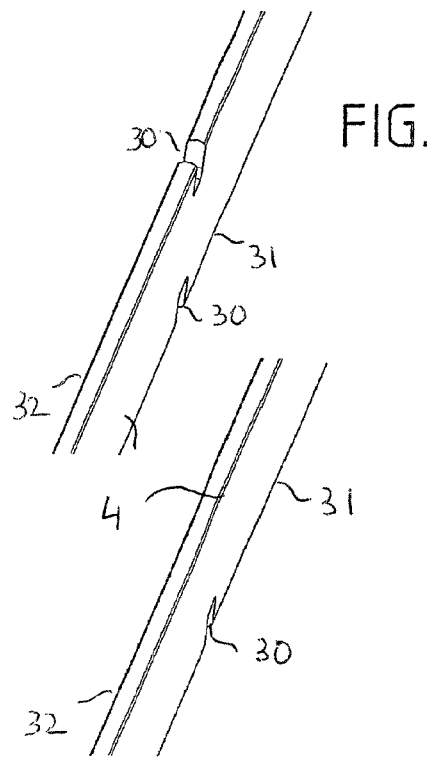
FIG. 9
FIG. 8

WINDSCREEN WIPER DEVICE

BACKGROUND OF THE INVENTION

1. Technical Field

The present invention relates to a windscreen wiper device comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein the oscillating arm is pivotally connected to the connecting device about a pivot axis near one end thereof, with the interposition of a joint part, wherein the wiper blade comprises a spoiler at a side thereof facing away from the windscreen to be wiped.

2. Related Art

Such a windscreen wiper device is generally known. This prior art windscreen wiper device is designed as a so-called "flat blade" or "yokeless blade", wherein no use is made of several yokes pivotally connected to each other, but wherein the wiper blade is biassed by the carrier element, as a result of which it exhibits a specific curvature. The spoiler is also called an "air deflector".

SUMMARY OF THE INVENTION

An object of the invention is to provide an improved windscreen wiper device.

A windscreen wiper includes a the connecting device that has a substantially U-shaped cross-section. Legs of the U-shaped cross-section are connected to the wiper blade on opposite sides thereof, wherein an interior space is left open between the connecting device and the wiper blade at the location of their interconnection, wherein the space forms a water channel for transporting rain water there through from a first side of the connecting device facing away from the free end of the oscillating arm to a second side of the connecting device facing towards the free end of the oscillating arm. The water channel automatically carries rain water therethrough from the first side of the connecting device having an over pressure relative to the environment to the second side having an under pressure relative to the environment as a result of an oscillatory movement of the oscillating arm. The legs are movable from an open position, wherein the wiper blade including the longitudinal strip can be placed inside the connecting device at the location of their interconnection, to a closed position, and wherein the legs are clamped around the flexible material of the wiper blade. In use, during each oscillatory movement of the oscillatory arm, rain water will be pressed from the first side where rain water accumulates, through the water channel, to the second side in order to be wiped away as a result of the oscillatory movement of the oscillating arm. the water channel preferably extends in longitudinal direction of the connecting device. In practice also the air flow due to the wind contributes to the existence of an under pressure at the location of the second side. With the use of a special tool, the legs are particularly pushed against a spring force (as a result of the elasticity of the material from which the connecting device is made) from the closed position into the open position, wherein the legs are allowed to automatically spring back from the open position into the closed position. The clamping force can only be given if the legs of the connecting device have a certain height/length, because of the used elasticity of the material. This clamping force will suppress any angular play between the wiper blade and the connecting device and allows to have a fixation therebetween with no added parts, no added material and no welding or gluing.

It is noted that the present invention is not restricted to the use of only one longitudinal strip forming the elastic carrier element that is particularly located in an central longitudinal groove of the wiper blade. Instead, the carrier element may also comprise two longitudinal strips, wherein the strips are disposed in opposite longitudinal grooves of the wiper blade.

In a preferred embodiment of a windscreen wiper device in accordance with the invention wherein in the closed position the legs are slightly deforming the flexible material of the wiper blade at the location of the interconnection of the connecting device and the wiper blade.

In another preferred embodiment of a windscreen wiper device according to the invention wherein a base of the U-shaped cross-section of the connecting device and the joint part comprise mutually cooperating protrusion/hole means in order to allow that the joint part can only be connected to the oscillating arm in a way that the spoiler is correctly orientated. Hence, in a butterfly arrangement as explained hereunder, it will be impossible to mount the wiper blade in a wrong position on a vehicle, so that the orientation of the spoiler is always good. Known vehicles are often equipped with a so-called "butterfly" wiper arrangement on the front side thereof. In such arrangement two oscillating arms are each pivotally connected to a mounting head fixed for rotation to a shaft driven by a small motor, wherein in use the one shaft rotates alternately in a counterclockwise and in a clockwise sense (this shaft corresponds to the oscillating arm at the drivers side of the vehicle), whereas the other shaft simultaneously rotates alternately in a clockwise and in a counterclockwise sense (this shaft corresponds to the oscillating arm at the passengers side of the vehicle). In use both shafts carry the mounting heads into rotation also, which in turn draw the oscillating arms into rotation and by means of the connecting devices move the wiper blades accordingly. In practice it has become apparent that, during replacement of windscreen wiper devices known from the above international patent publication no. WO 00/73113 (Robert Bosch GmbH) and used in a vehicle with the above-described "butterfly" wiper arrangement, one must carefully look which windscreen wiper device is meant to be mounted on the oscillating arm at the drivers side of the vehicle and which windscreen wiper device is meant to be mounted on the oscillating arm at the passenger side of the vehicle. This is now obviated by the present invention.

In another preferred embodiment of a windscreen wiper device in accordance with the invention the spoiler continuously extends along the length of the wiper blade, wherein the space is defined between the connecting device and the spoiler. In other words, the spoiler is not made of two sub-spoilers mounted on opposite sides of the connecting device and extending from the connecting device to a respective connecting piece of the windscreen wiper device. On the contrary, the spoiler extends in its entirety from one connecting piece, through the connecting device (that is between the legs of the U-shaped cross-section thereof), to the other connecting device. Consequently, the wiping properties of the present wiper blade are improved, also because rain water is efficiently guided along the entire spoiler and through the closed space having no blockages at all in order to be wept away by the oscillatory movement of the oscillating arm. the spoiler is preferably made in one piece with the wiper blade.

In another preferred embodiment of a windscreen wiper device in accordance with the invention in the closed position the wiper blade and the longitudinal strip mutually fixated by the legs at the location of the interconnection of the connecting device and the wiper blade, wherein in the closed position the wiper blade is allowed to move in longitudinal direction relative to the longitudinal strip outside the location of the interconnection of the connecting device and the wiper blade. In other words, the wiper blade and the longitudinal strip are not allowed to mutually move under the connecting device, but in all other areas along the wiper blade a slight movement thereof is made possible in order to allow the wiper blade to follow any curvature of the windscreen to be wiped. In the closed position the legs are particularly slightly deforming (the rubber of) the wiper blade at the location of the interconnection of the connecting device and the wiper blade.

It is noted that the interconnection of the connecting device and the wiper blade through a clamping operation is efficiently dealt with in case the connecting device is made of metal.

In another preferred embodiment of a windscreen wiper device in accordance with the invention the joint part is detachably connected to the connecting device by engaging protrusions of the connecting device, at the location of the pivot axis, in recesses provided in the joint part. This is preferably realized through a snapping or clipping operation.

In another preferred embodiment of a windscreen wiper device according to the invention the joint part has an at least substantially U-shaped cross-section at the location of its connection to the connecting device, and wherein the joint part is provided with a recess provided coaxially with the pivot axis. In particular, the protrusions extend outwards on either side of the connecting device and are preferably cylindrical in shape. In the alternative, the protrusions are spherical or frusto-conical in shape. the protrusions that function as bearing surfaces are thus paced far apart, so that forces exerted thereon will be relatively low. In yet another preferred variant the joint part is provided with co-axial through holes in legs of the U-shaped cross-section thereof, wherein a pivot pin is inserted in the through holes.

In another preferred embodiment of a windscreen wiper device in accordance with the invention the protrusions are provided with co-axial through holes. Accordingly, the wiper blade may then be connected to the oscillating arm on the basis of a so-called "sidelock system". The oscillating arm is provided with a joint pin or a pivot pin to be inserted in the co-axial through holes. the pivot pin protrudes in a direction towards the wiper blade and has a pivot axis extending in a direction of the oscillating movement of the oscillating arm.

In another preferred embodiment of a windscreen wiper device according to the invention the joint part comprises at least one resilient tongue engaging in a correspondingly shaped hole provided in a base of a U-shaped cross-section of the oscillating arm, and wherein the resilient tongue is rotatable along a hinge axis between an outward position retaining the wiper blade onto the oscillating arm and an inward position releasing the wiper blade from the oscillating arm. Accordingly, the wiper blade may then be connected to the oscillating arm on the basis of a so-called "toplock system" on the basis of a bayonet connection. In order to connect the wiper blade onto the oscillating arm, the resilient tongue is initially pushed in against a spring force— as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

In another preferred embodiment of a windscreen wiper device in accordance with the invention the longitudinal strip is provided along its interior and/or exterior edge with at least one recess cooperating with a corresponding protrusion on the connecting device. Instead of or in addition thereto the longitudinal strip is provided with at least one upwardly extending protrusion cooperating with a corresponding recess on the connecting device.

THE DRAWINGS

The invention will now be explained more in detail with reference to figures illustrated in a drawing, wherein FIG. 1 is a perspective, schematic view of a preferred embodiment of a windscreen wiper device according to the invention, with and without (a part of) an oscillating arm, respectively;

FIG. 2 is an exploded view of a part of the windscreen wiper device of FIG. 1, showing a connecting device according to a first preferred embodiment, as well as a joint art;

FIG. 3 shows in detail the connecting device according to the first preferred embodiment of FIG. 2;

Figure 1:
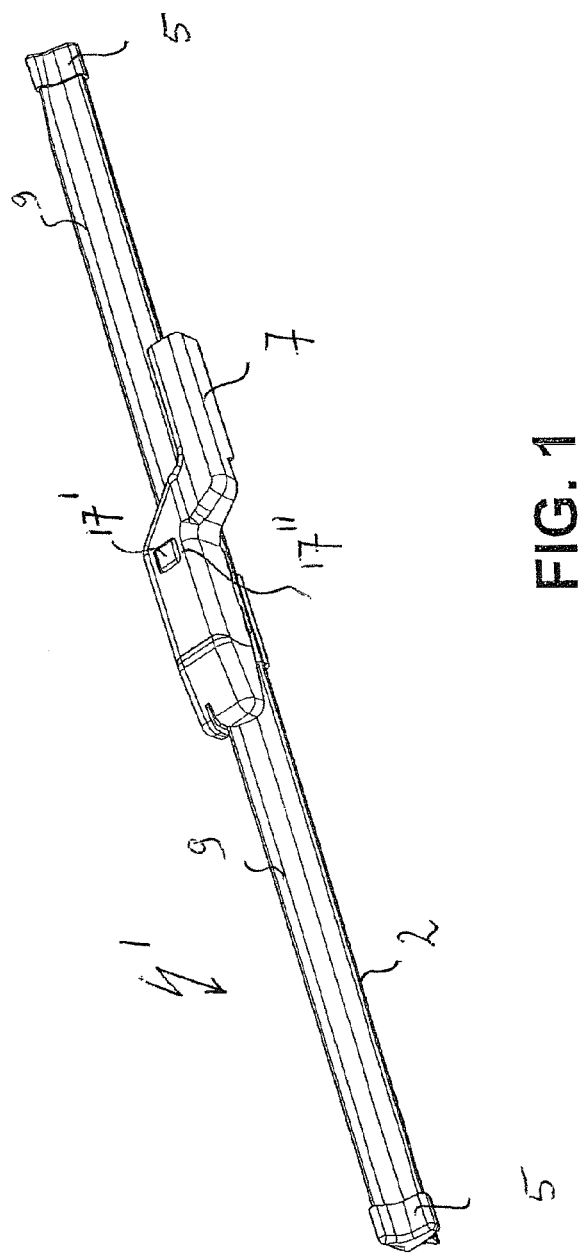
Figure 1:
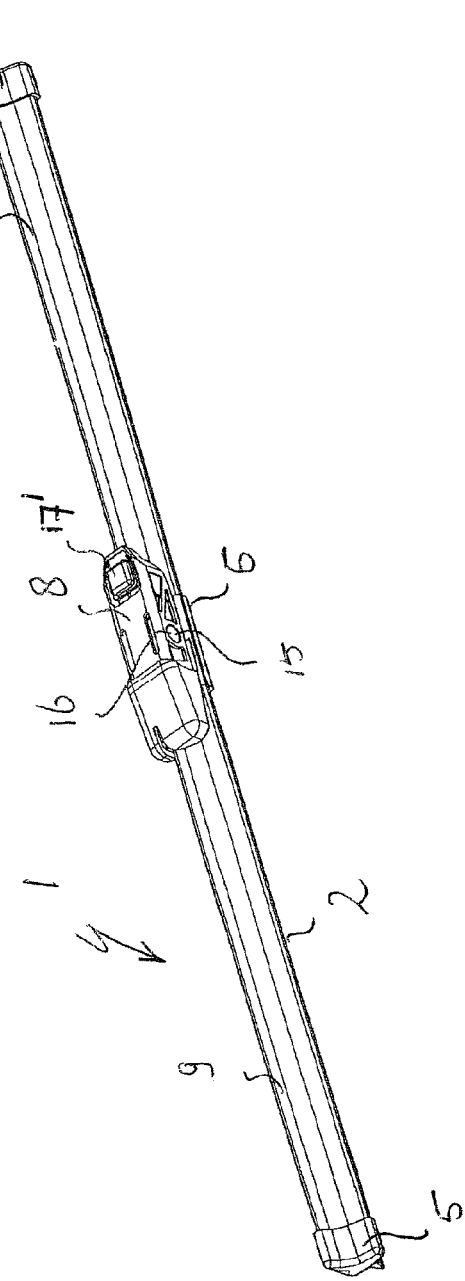
Figure 5:
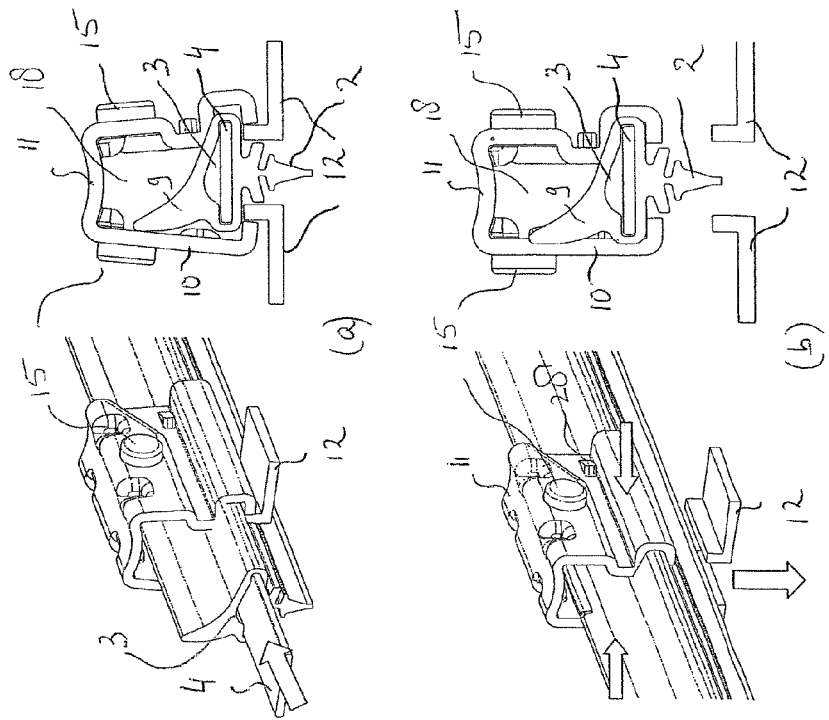
FIGS. 4 and 5 show in perspective and in cross-section the working principle of the connecting device according to the first preferred embodiment, as well as the way a wiper blade is connected thereto.
Figure 4:
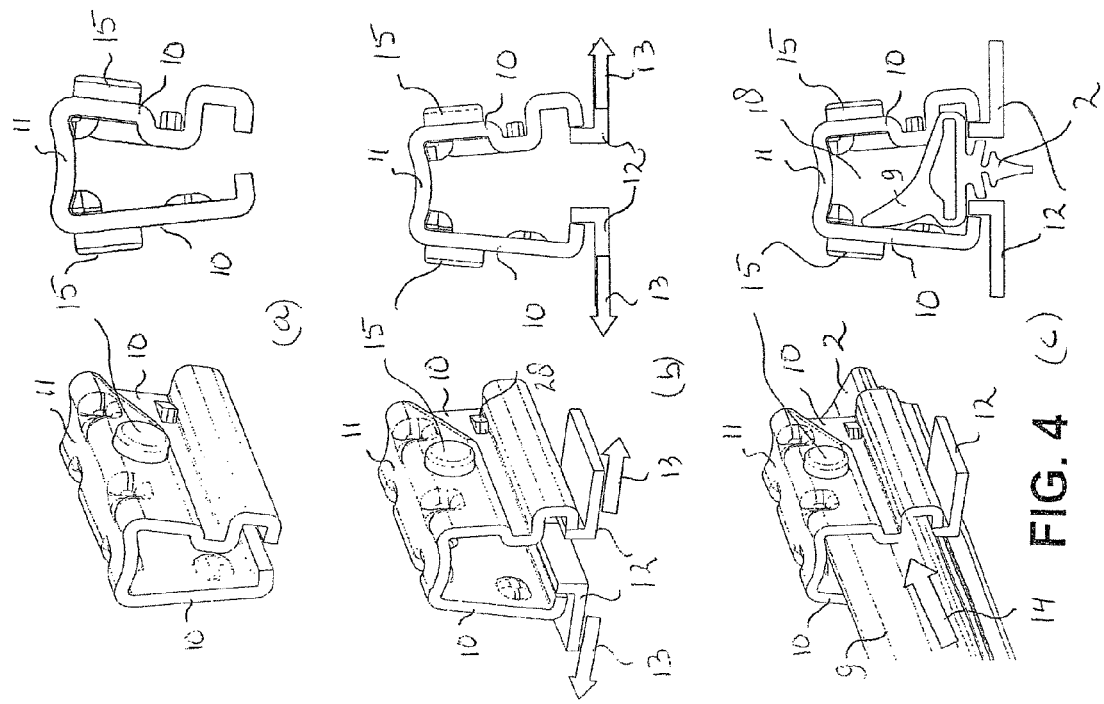
Figure 10:
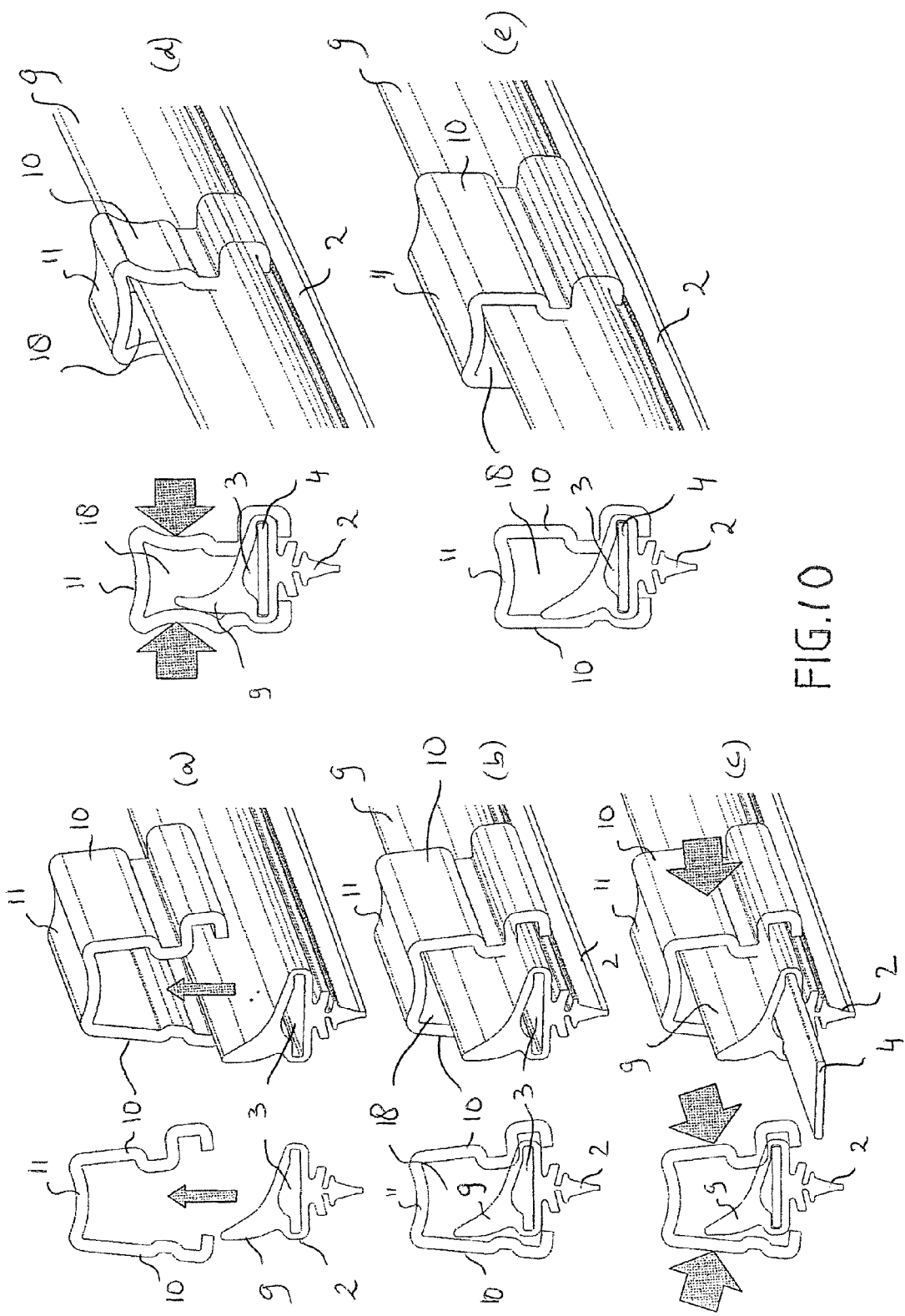

FIGS. 6 and 7 correspond to FIGS. 4 and 5, but now relating to the connecting device according to a second preferred embodiment;

FIGS. 8 and 9 are perspective views of two embodiments of a longitudinal strip cooperating with a connecting device, as used in a windscreen wiper device of FIG. 1;

FIG. 10 corresponds to FIGS. 4 and 5, but now relating to a third embodiment.

DETAILED DESCRIPTION

FIG. 1 shows a preferred variant of a windscreen wiper device 1 according to the invention. the windscreen wiper device is built up of an elastomeric wiper blade 2 comprising a central longitudinal groove 3, wherein a longitudinal strip 4 made of spring band steel is fitted in the longitudinal groove 3 (see FIGS. 5, 6 and 7). the strip 4 forms a flexible carrier element for the rubber wiper blade 2, as it were, which is thus biassed in a curved position (the curvature in operative position being that of a windscreen to be wiped). An end of the strip 4 and/or an end of the wiper blade 2 is connected on either side of the windscreen wiper device 1 to respective connecting pieces or "end caps" 5. In this embodiment, the connecting pieces 5 are separate constructional elements, which may be form-locked as well as force-locked to both ends of the strip 4 and/or ends of the wiper blade 2. In another preferred variant, the connecting pieces 5 are in one piece with the strip 4 made of spring band steel. The windscreen wiper device 1 is furthermore built up of a connecting device 6 of metal for connecting an oscillating wiper arm 7 thereto, with the interposition of a joint part 8. The oscillating wiper arm 7 is pivotally connected to the connecting device 6 about a pivot axis near one end. The preferred embodiment of FIG. 1 according to the invention comprises a spoiler or "air deflector" 9 which is made in one piece with the rubber wiper blade 2 and which extends along the entire length thereof. This will be explained more in detail below.

Although not shown in FIG. 1, but fully understood by a skilled person, the oscillating arm 7 is connected to a mounting head fixed for rotation to a shaft driven by a small motor. In use, the shaft rotates alternately in a clockwise and in a counter-clockwise sense carrying the mounting head into rotation also, which in turn draws the oscillating arm 7 into rotation and by means of the connecting device 6 moves the wiper blade 2.

In FIG. 2 an exploded view is given of a part of the windscreen wiper device 1 of FIG. 1, showing the connecting device 6 according to a first preferred embodiment, as well as the joint part 8 of FIG. 1. FIG. 3a shows in detail the connecting device 6 according to the first preferred embodiment of FIG. 2, while in FIG. 3b the connecting device 6 according to a second preferred embodiment is shown. In both embodiments the connecting devices 6 have a U-shaped cross-section, wherein legs 10,19 of the U-shaped cross-section are connected to the rubber of the wiper blade 2 on opposite sides thereof. In both embodiments the spoiler 9 extends in its entirety from one connecting piece 5 on one end of the windscreen wiper device 1, through the connecting device 6, i.e. between the legs 10,19 of the U-shaped cross-section thereof, to the other connecting device 5 on the other end of the windscreen wiper device 1.

FIGS. 4 and 5 show in perspective and in cross-section the working principle of the connecting device 6 according to the first preferred embodiment, as shown in FIG. 3a. As mentioned earlier, this connecting device 6 has a U-shaped cross-section with the legs 10 and a base 11. With the help of a special tool 12 the legs 10 are moved from a non-operative position, as shown in FIG. 4a, into an open position, as shown in FIG. 4b. In fact, the tool 12 pushes in the direction of arrows 13 the legs 10 outwardly against a spring force of the metal from which the connecting device 6 is manufactured. This is possible as a result of the elastical properties of the metal. In the open position (FIG. 4b) the wiper blade 2 is mounted inside the connecting device 6 at the location of their interconnection in the direction of arrow 14, to an intermediate position, as shown in FIG. 4c. In the latter position the longitudinal strip 4 of the carrier element is slided into the central longitudinal groove 3 of the wiper blade 2, as shown in FIG. 5a. If considered expedient, a lubricant is used to facilitate insertion of the longitudinal strip 4 inside the longitudinal groove 3. Finally, when the wiper blade 2 and the longitudinal strip 4 are in the right position, the special tool 12 is removed. Consequently, the legs 10 of the connecting device 6 are allowed to spring back into a closed position (FIG. 5b), wherein the legs 10 are clamped around the wiper blade 2, while slightly deforming the rubber of the wiper blade 2 at the location where the legs 10 engage the rubber. In the closed position the wiper blade 2 and the longitudinal strip 4 are mutually fixated by the legs 10 at the location of the interconnection of the connecting device 6 and the wiper blade 2, whereas in the closed position the wiper blade 2 is allowed to move in longitudinal direction relative to the longitudinal strip 4 outside the location of the interconnection of the connecting device 6 and the wiper blade 2.

As shown in FIGS. 3, 4 and 5, the connecting device 6 according to the first embodiment comprises two cylindrical protrusions 15 extending outwards on either side of the connecting device 6. These protrusions 15 pivotally engage in identically shaped cylindrical recesses 16 of the plastic joint part 8. the protrusions 15 act as bearing surfaces at the location of the pivot axis in order to pivot the joint part 8 (and the oscillating arm 7 attached thereto) about the pivot axis near one end of the oscillating arm 7. The protrusions 15 are preferably in one piece with the connecting device 6. In the alternative, the protrusions 15 are part of a single pivot pin perpendicular to the connecting device 6. As can be seen in FIGS. 1 and 2, the joint part 8 comprises a resilient tongue 16 extending outwardly, while the oscillating arm 7 has an U-shaped cross-section at the location of its connection to the joint part 8, so that the tongue 17' engages in an identically shaped hole 17" provided in a base of the U-shaped cross-section. The connecting device 6 with the wiper blade 2 is mounted onto the oscillating arm 7 as follows. The joint part 8 being already clipped onto the connecting device 6 is pivoted relative to the connecting device 6, so that the joint part 8 can be easily slided on a free end of the oscillating arm 7. During this sliding movement the resilient tongue 17' is initially pushed in against a spring force and then allowed to spring back into the hole 17", thus snapping, that is clipping the resilient tongue 16 into the hole 17. This is a so-called bayonet-connection. The oscillating arm 7 together with the joint part 8 may then be pivoted back in a position parallel to the wiper blade 2 in order to be ready for use. By subsequently pushing in again the resilient tongue 17' against the spring force (as if it were a push button), the connecting device 6 and the joint part 8 together with the wiper blade 2 may be released from the oscillating arm 7. Dismounting the connecting device 6 with the wiper blade 2 from the oscillating arm 7 is thus realized by sliding the connecting device 6 and the joint part 8 together with the wiper blade 2 in a direction away from the oscillating arm 7.

As can be seen from FIGS. 4 and 5, an interior space 18 is left open between the connecting device 6 and the wiper blade 2/spoiler 9 at the location of their interconnection. In other words, the space 18 is defined by the spoiler 9 of the wiper blade 2, as well as the legs 10 and the base 11 of the connecting device 6. the interior space 18 functions as a water channel extending in longitudinal direction of the connecting device 6. During use the water channel transports rain water there through. In other words, in use rain water is carried away from a first side of the connecting device 6 facing away from the free end of the oscillating 7 arm to a second side of the connecting device 6 facing towards the free end of the oscillating arm 7. As a result of the oscillatory movement of the oscillating 7, in practice an over pressure relative to the environment exists at the location of the first side of the connecting device 6, while an under pressure relative to the environment is present at the location of the second side of the connecting device 6. Due to the over pressure and the under pressure rain water is "automatically" pressed through the water channel.

FIGS. 6 and 7 show in perspective and in cross-section the working principle of the connecting device 6 according to the second preferred embodiment. Like the connecting device 6 of the first embodiment, also this connecting device 6 has a U-shaped cross-section with legs 19 and a base 20. the legs 19 are moved from a non-operative position being similar to an open position into a closed position. First, the longitudinal strip 4 of the carrier element is slided into the central longitudinal groove 3 of the wiper blade 2. Then, in the open position, the wiper blade 2 with the longitudinal strip 4 is mounted inside the connecting device 6 at the location of their interconnection. Further, when the wiper blade 2 together with the longitudinal strip 4 is in the right position, the legs 19 are moved inwardly into a closed position, as shown at the bottom of FIG. 6.

The above is identical to the situation as shown in FIGS. 4 and 5. However, as shown in FIGS. 6 and 7, the connecting device 6 according to the second embodiment comprises two cylindrical protrusions 21,22 extending outwards on either side of the connecting device 6. These protrusions 21,22 pivotally engage in identically shaped cylindrical recesses 16 of the plastic joint part 8. the protrusions 21,22 act as bearing surfaces at the location of the pivot axis in order to pivot the joint part 8 (and the oscillating arm 7 attached thereto) about the pivot axis near one end of the oscillating arm 7. The protrusions 21,22 are preferably in one piece with the connecting device 6. In the alternative, the protrusions 21,22 are part of a single pivot pin perpendicular to the connecting device 6. These protrusions 21,22 may also be provided with co-axial through holes 23,24 as shown, for receiving a transverse pivot pin provided on the oscillating arm 7 for pivotally connecting the connecting device 6 to the oscillating arm 7 near its free end about a pivot axis of the transverse pin. As can be seen from FIG. 7, the base 20 of the U-shaped cross-section of the connecting device 6 comprises a hole or recess 25 for receiving a downwardly extending finger or protrusion 26 on the joint part 8. The hole 25 and the protrusion 26 thus cooperate in order to allow that the joint part 8 can only be connected to the oscillating arm 7 in a way that the spoiler 9 is always correctly orientated. the pivot axis is designated with 27 in FIG. 6.

It is noted that the connecting device 6 according to the first and the second embodiments are particularly provided with a outwardly extending protrusion 28 cooperating with a correspondingly shaped stop surface 29 (FIG. 2) on the joint part 8. In other words, in case the primary retaining means in the form of the resilient tongue 17' on the joint part 8 and the hole 17" on the oscillating arm 7 would disfunction, for any reason, then secondary retaining means in the form of the protrusion 28 on the connecting device 6 and the stop surface 29 on the joint part 8 are provided for retaining the wiper blade 2 onto the oscillating arm 7. the protrusions 28 and the stop surface 29 thus block any longitudinal movement of the wiper blade 2 relative to the oscillating arm 7.

In FIG. 8 several views are given on the longitudinal strip 4, wherein a recess 30 is cut on an interior longitudinal side 31 and/or an exterior longitudinal side 32 thereof. These recesses 30 cooperate with corresponding protrusions 33 on the legs 10,19 of the connecting device 6 in order to enhance the retention of the wiper blade 2. Of course, it is also possible (instead of the recesses/protrusions or in addition thereto) that one or two recess (es) 34 in the leg(s) 10,19 cooperate (s) with one or two upwardly extending protrusions 35 on the longitudinal strip 4. This is shown in FIG. 9. The retention of the wiper blade 2 may also be (whether or not the only) result of friction between legs 10, 19 or the connecting device 6 and the rubber of the wiper blade 2.

FIG. 10 corresponds to FIGS. 4 and 5, but now relating to a third embodiment, wherein corresponding parts have been designated with the same reference numerals, and wherein FIGS. 10a through 10e chronologically show stepwise the mounting of a wiper blade 2 onto a connecting device 6 having a U-shaped cross-section with a base 11 and legs 10. In the non-operative position of FIG. 10a the legs 10 are already in an open position to allow mounting of the wiper blade 2 between the legs 10, that is within the U-shaped cross-section, while leaving a space 18 open between a spoiler 9 of the wiper blade 2, the legs 10 and the base 11 of the connecting device 6 (FIG. 10b). Again, the space 18 functions as a water channel as previously described regarding the first and second embodiments shown in FIGS. 4 and 5, as well as FIGS. 6 and 7, respectively. In the mounted position of the wiper blade 2 in FIG. 10b the legs 10 of the U-shaped cross-section are crimped or crushed in the direction of arrows of FIGS. 10c and 10d. As a result of a permanent deformation of the legs 10, the legs 10 are forced to stay in the position of FIG. 10e, despite of any spring back phenomenon regarding the legs 10 when the crimping or crushing force is released (FIG. 10e). Instead of or in addition to the deformation, also a cover (not shown) provided on the U-shaped cross-section can be used to force the legs 10 to stay in the position of FIG. 10e.

The invention is not restricted to the variants shown in the drawing, but it also extends to other preferred embodiments that fall within the scope of the appended claims.

The invention claimed is:

1. A windscreen wiper device comprising an elastic, elongated carrier element, as well as an elongated, one-piece wiper blade of a flexible material, which can be placed in abutment with a windscreen to be wiped, which windscreen wiper device comprises a connecting device for attachment to an oscillating arm, wherein said oscillating arm is pivotally connected to said connecting device about a pivot axis near one end thereof, with the interposition of a joint part, wherein said wiper blade comprises a spoiler at a side thereof facing away from the windscreen to be wiped, wherein said connecting device has a substantially U-shaped cross-section, wherein legs of said U-shaped cross-section are connected to the flexible material of said wiper blade on opposite sides thereof with said spoiler being positioned between said legs, wherein an interior space is left open and is bound along its entire perimeter by said connecting device and said wiper blade at the location of their interconnection, wherein said interior space forms a water channel for transporting rain water therethrough from a first side of said connecting device to a second side of said connecting device, and wherein said water channel acts to automatically carry rain water therethrough from said first side of said connecting device having an over pressure relative to the environment to said second side having an under pressure relative to the environment in response to an oscillatory movement of the oscillating arm, wherein said legs are elastically movable from an open position, wherein said wiper blade can be placed inside said connecting device at the location of their interconnection, to a closed position, and wherein said legs are clamped directly into engagement with the flexible material of said wiper blade.

2. A windscreen wiper device according to claim 1, wherein in said closed position said legs are slightly deforming the flexible material of said wiper blade at the location of the interconnection of said connecting device and said wiper blade.

3. A windscreen wiper device according to claim 1, wherein a one of said base of the U-shaped cross-section of said connecting device and said joint part comprises protrusions and the other of said base of said U-shaped cross-section of said connecting device and said joint part comprises holes to provide only one-way connection of said joint part to the oscillating arm in a way that said spoiler is correctly orientated.

4. A windscreen wiper device according to claim 1, wherein said water channel extends in longitudinal direction of said connecting device.

5. A windscreen wiper device according to claim 1, wherein said spoiler continuously extends along the length of said wiper blade, and wherein said space is defined between said connecting device and said spoiler.

6. A windscreen wiper device according to claim 1, wherein said legs can be pushed against a spring force from the closed position into the open position, and wherein said legs can be allowed to spring back from said open position into said closed position.

7. A windscreen wiper device according to claim 1, wherein in said closed position said wiper blade and a longitudinal strip are mutually fixated by said legs at the location of the interconnection of said connecting device and said wiper blade, and wherein in said closed position said wiper blade is allowed to move in longitudinal direction relative to said longitudinal strip outside the location of the interconnection of said connecting device and said wiper blade.

8. A windscreen wiper device according to claim 1, wherein said connecting device is made of metal.

9. A windscreen wiper device according to claim 1, wherein said joint part is detachably connected to said connecting device by engaging protrusions of said connecting device, at the location of said pivot axis, in recesses provided in said joint part.

10. A windscreen wiper device according to claim 9, wherein said joint part has an at least substantially U-shaped cross-section at the location of its connection to said connecting device, and wherein said joint part is provided with a recess provided coaxially with said pivot axis.

11. A windscreen wiper device according to claim 9, wherein the protrusions extend outwards on either side of said connecting device.

12. A windscreen wiper device according to 9, wherein said protrusions are provided with co-axial through holes.

13. A windscreen wiper device according to claim 9, wherein said joint part comprises at least one resilient tongue engaging in a correspondingly shaped hole provided in a base of a U-shaped cross-section of said oscillating arm, and wherein said resilient tongue is rotatable along a hinge axis between an outward position and an inward position.

14. A windscreen wiper device according to claim 1, wherein said carrier element includes a longitudinal strip which is provided along its interior and/or exterior edge with at least one recess cooperating with a corresponding protrusion on the connecting device.

15. A windscreen wiper device according to claim 1, wherein a longitudinal strip is provided with at least one upwardly extending protrusion cooperating with a corresponding recess on the connecting device.

16. A windscreen wiper device, comprising:
a wiper blade of a flexible material and including a spoiler formed integrally therewith;
a carrier element biasing the wiper blade into a curved position;
a connecting device having a generally U-shaped cross-section with legs that are directly engaged with said flexible material of said wiper blade on opposite sides thereof with said spoiler being positioned between said legs, and wherein an interior space is bounded by said connecting device and said wiper blade to define a water channel for automatically transporting rain from a first side of said connecting device to a second side of said connecting device during use, and wherein said legs are elastically moveable between detached open positions and closed positions with said legs being clamped directly into engagement with said flexible material of said wiper blade; and
a joint part pivotably securable with said connecting device for attachment with an oscillating wiper arm.

17. The windscreen wiper device as set forth in claim 1 wherein a bottom portion of each of the legs includes a U-shaped portion which wraps around the wiper blade.

18. The windscreen wiper device as set forth in claim 1 wherein a bottom portion of at least one of the legs includes a U-shaped portion which wraps around the wiper blade.

* * * * *